United States Patent [19]
Kinoshita

[11] Patent Number: 5,440,303
[45] Date of Patent: Aug. 8, 1995

[54] DIRECTION DETECTING APPARATUS AND METHOD THEREOF

[75] Inventor: Hidehiko Kinoshita, Hyogo, Japan

[73] Assignee: Mitsubishi Denki Kabushiki Kaisha, Tokyo, Japan

[21] Appl. No.: 181,409

[22] Filed: Jan. 13, 1994

[30] Foreign Application Priority Data

Feb. 23, 1993 [JP] Japan .................................. 5-056354

[51] Int. Cl.6 .............................................. G08G 1/00
[52] U.S. Cl. ................................ 340/901; 340/988; 364/449; 364/457; 33/356; 33/357
[58] Field of Search ................ 340/988; 364/449, 457; 33/356, 357

[56] References Cited

U.S. PATENT DOCUMENTS

| | | | |
|---|---|---|---|
| 4,852,012 | 7/1989 | Suyama | 364/449 |
| 4,882,689 | 11/1989 | Aoki | 340/988 |
| 5,283,743 | 2/1994 | Odagawa | 340/990 |

FOREIGN PATENT DOCUMENTS

319929 3/1991 Japan .

Primary Examiner—John K. Peng
Assistant Examiner—Daryl C. Pope

[57] ABSTRACT

In a direction detecting apparatus for a vehicle, when signals input from an earth magnetic sensor into calculating means are judged to be outside a predetermined judging area, an alarm for prompting magnetization correction is given, thereby the direction detecting apparatus can surely display the alarm at any case without the necessity to rotate the vehicle.

15 Claims, 8 Drawing Sheets

DIRECTION DETECTING APPARATUS AND METHOD THEREOF

BACKGROUND OF THE INVENTION

1. Field of the Invention

The present invention relates to a direction detecting apparatus and method for detecting a direction based on the earth magnetism to generate a direction signal corresponding to a moving direction of a movable body such as a vehicle and so forth.

2. Description of Prior Art

Figure 1:
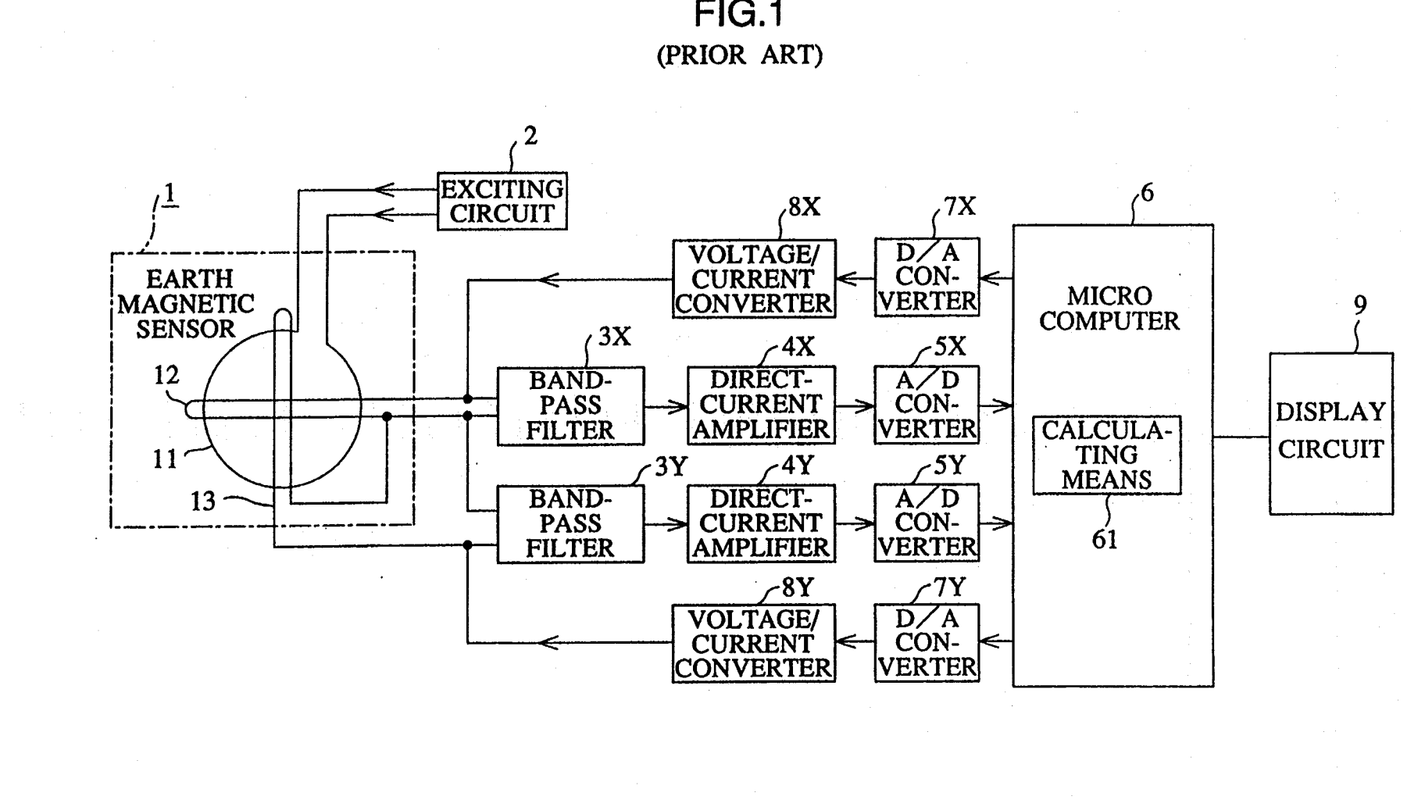
FIG. 1 is a block diagram showing a conventional direction detecting apparatus.

FIG. 1 is a block diagram showing a conventional direction detecting apparatus disclosed in, for example, a Japanese Patent Publication (Kokoku) No. 3-19929. In the figure, reference numeral 1 is an earth magnetic sensor, mounted on a vehicle, for detecting the earth magnetism, 11 is an excited coil wound on a not-shown magnetic core of the earth magnetic sensor and excited by an exciting frequency f, 12 is an X-side secondary coil wound on the outer periphery of the magnetic core, and 13 is a Y-side secondary coil orthogonal to the X-side secondary coil 12 and wound on the magnetic core. Reference numeral 2 is an exciting circuit for supplying an exciting signal of the exciting frequency f to the excited coil 11 of the magnetic sensor. $3_X$ and $3_Y$ are band-pass filters for amplifying signals of even number order of frequencies, $4_X$ and $4_Y$ are direct-current amplifiers for rectifying the output signals from the band-pass filters $3_X$ and $3_Y$ for direct-current amplification, and $5_X$ and $5_Y$ are A/D converters for converting the output voltages from the direct-current amplifiers $4_X$ and $4_Y$ into digital signals.

Reference numeral 6 is a microcomputer for calculating an angle between the moving direction of the vehicle which is mounting the A/D converters $5_X$ and $5_Y$ and the horizontal component of the earth magnetism, based on the output signals from the A/D converters $5_X$ and $5_Y$, and 61 is calculating means, realized by software in the microcomputer 6, for calculating the above-mentioned angle. Reference symbols $7_X$ and $7_Y$ are D/A converters for converting digital signals, outputted from the microcomputer 6, for correcting the magnetization of the vehicle, into analog signals, $8_X$ and $8_Y$ are voltage/current converters for outputting currents proportional to the input voltages from the D/A converters $7_X$ and $7_Y$ into an X-side secondary coil 12 and a Y-side secondary coil 13 in the earth magnetic sensor 1 to generate magnetic field to cancel the amount of the magnetization. 9 is a display circuit for displaying the moving direction of the vehicle based on the result of the calculation in the calculating means 61 in the microcomputer 6.

Next, the operation will be described. When the earth magnetic sensor 1 such as the one as mentioned above is mounted in the vehicle, it is influenced by the magnetization of the car body. The magnetization of the car body always accompanies with fluctuation due to its change in time or forcible magnetization by an external environment. Therefore, corrections for removing the influences due to the magnetization (hereinafter referred to as magnetization correction) must be effected frequently. When the amount of magnetization of the car body is changed to constitute a hindrance in displaying the direction, if an alarm is displayed to prompt the correction of the magnetization, a bad effect caused by believing the error display as it is can be avoided, and unnecessary correction is not effected when the display is correct, so that an efficient magnetization correction can be performed.

In the following, the operation of such a magnetization correction as mentioned above will be described. In FIG. 1, at the Y-side secondary coil 13 and the X-side secondary coil 12 in the earth magnetic sensor 1, voltages $e_X$ and $e_Y$ given by the following equations are generated.

$$e_X = KH\cos\theta \quad (1)$$

$$e_Y = KH\sin\theta \quad (2)$$

Figure 9:
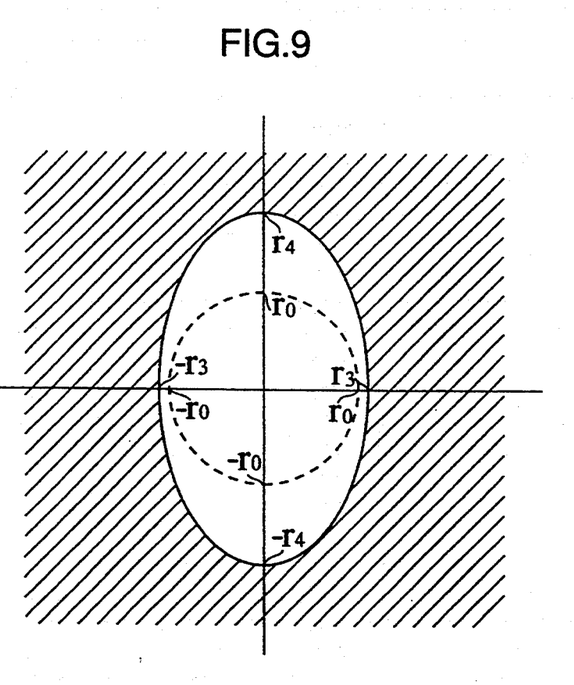
FIG. 9 is an explanatory diagram showing another example of a judging area in the above-mentioned embodiment.

Here, K is a constant, H is a horizontal component of the earth magnetism, $\theta$ is an angle between the horizontal component of the earth magnetism and the X-side secondary coil 12. When there is no influence due to the magnetization of the car body, the locus of the output signals $V_X$ and $V_Y$, when the vehicle is rotated one time, is a circle having its center at the origin 0 as illustrated in FIG. 9 by a dash line. Accordingly, when the voltages $e_X$ and $e_Y$ can be determined, the angle $\theta$ can be calculated based on the above-mentioned equations (1) and (2) so that the moving direction of the vehicle can be obtained.

Figure 2:
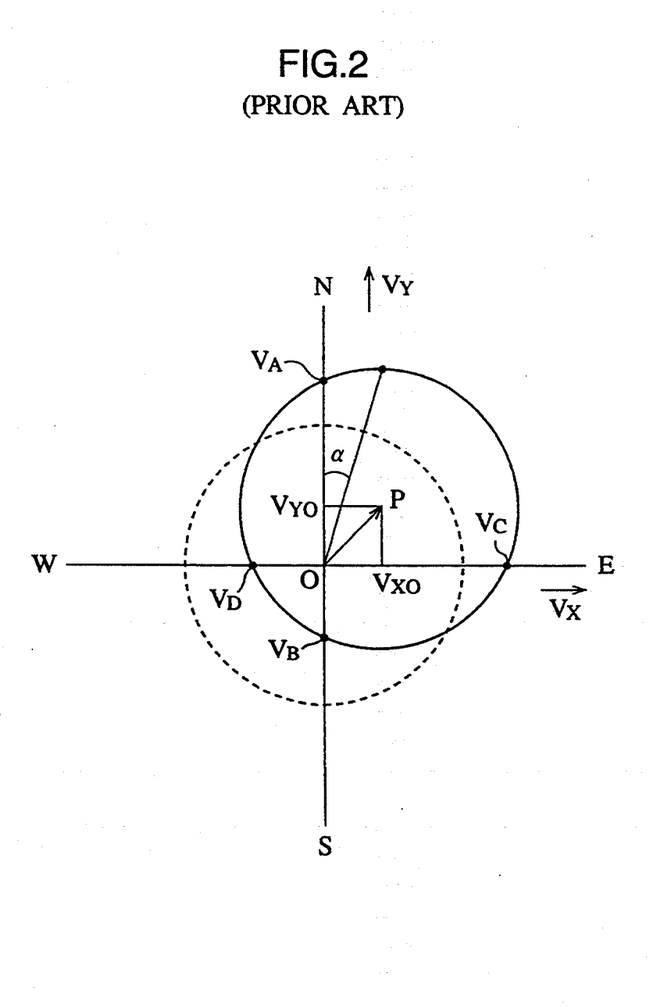
FIG. 2 is an explanatory diagram for explaining the operation of the apparatus shown in FIG. 1.

When there is a magnetic field vector due to the magnetization of the car body, however, the locus of the output signals $V_X$ and $V_Y$ when the vehicle is rotated one time is a circle having its center at a point P different from the origin 0 as illustrated in FIG. 2 by a continuous line. The center P of the circle is moved in the direction of the magnetic field vector due to the magnetization of the car body in proportion to its amount. The magnetic field vector OP due to the magnetization of the car body shown in FIG. 2 is expressed by an X-axis component $V_{XO}$ and a Y-axis component $V_{YO}$. Assuming that the values of the output signals $V_Y$ and $V_X$ at the Y axis and the X axis when the vehicle is rotated one time are $V_A$, $V_B$, $V_C$, and $V_D$, then the Y-axis component $V_{YO}$ and the X-axis component $V_{XO}$ can be determined by the following equations.

$$V_{YO} = (V_A + V_B)/2 \quad (3)$$

$$V_{XO} = (V_C + V_D)/2 \quad (4)$$

Namely, when the vehicle is rotated, the microcomputer 6 detects the values $V_A$, $V_B$, $V_C$, and $V_D$ as digital values to execute the calculations of the above equations, thereby it is possible to obtain the amounts of the magnetization $V_{YO}$ and $V_{XO}$. When the amounts of the magnetization $V_{YO}$ and $V_{XO}$ exceed a predetermined value, it is judged that the angle error a is too large so that an alarm signal is output to the display circuit 9 to display an alarm.

Since the conventional direction detecting apparatus is constructed as described above, there were problems in that at least one rotation of the vehicle is necessary to calculate the amount of the magnetization of the car body and to display an alarm when the angle error is judged to be large, and since the data at particular points, namely the values at the X section or the Y section of the locus of the circle, are necessary, if the locus of the circle of the output signals $V_X$ and $V_Y$ when the vehicle is rotated one time does not intersect the X axis or the Y axis, there is no X section $V_C$ or $V_D$ or Y section $V_A$ or $V_B$, so that the amount of the magnetization $V_{YO}$ or $V_{XO}$ cannot be calculated.

SUMMARY OF THE INVENTION

In view of the foregoing, it is an object of the present invention to provide a direction detecting apparatus in which it is not necessary to rotate a vehicle one time to display an alarm for prompting magnetization correction, and which can display the alarm even when the output signals $V_X$ or $V_Y$ of the circle of locus does not intersect the X axis or the Y axis.

According to the first aspect of the present invention, for achieving the above-mentioned objects, there is provided a direction detecting apparatus comprising calculating means for calculating an angle between a moving direction of a movable body and the horizontal component of the earth magnetism, area judging means for judging whether or not the signals input from the earth magnetic sensor are outside the judging area for judging whether or not the movable body is magnetized, and alarming means for giving an alarm when the input signals of the calculating means is judged to be outside the judging area.

As stated above, in the direction detecting apparatus according to the first aspect of the present invention, the alarming means alarms when the signals input from the earth magnetic sensor into the calculating means are judged to be got outside the judging area for judging whether or not the movable body is magnetized, thereby the direction detecting apparatus which can surely display an alarm at any case without the necessity to rotate the vehicle one time.

According to the second aspect of the present invention, there is provided a direction detecting apparatus further comprising time judging means for judging whether or not the time of the input signals of the calculating means being outside the judging area continues for more than a previously set predetermined time, whereby the alarming means alarms when the input signals of the calculating means are judged to be outside the judging area for a time more than the predetermined time.

As stated above, in the direction detecting apparatus according to the second aspect of the present invention, the alarming means gives an alarm when the time, in which the input signals of the calculating means are outside the judging area, is judged to be continued for more than the previously set predetermined time, thereby when the input signals of the calculating means are instantaneously outside the judging area due to magnetic noise and so forth, the alarm is prevented to be erroneously generated.

According to the third aspect of the present invention, there is provided a direction detecting apparatus in which the predetermined time as a base of the judgement by the time judging means changes in accordance with the degree of the amount of the input signals of the calculating means that are outside the judging area.

As stated above, in the direction detecting apparatus according to the third aspect of the present invention, the time judging means changes the predetermined time for determining the generation of the alarm in accordance with the degree of the amount of the input signals of the calculating means that are outside the judging area, thereby the frequency of the generation of alarms can be changed depending on the amount of the magnetization of the car body.

The above and further objects and novel features of the invention will more fully appear from the following detailed description when the same is read in connection with the accompanying drawings. It is to be expressly understood, however, that the drawings are for purpose of illustration only and are not intended as a definition of the limits of the of the invention.

DESCRIPTION OF THE PREFERRED EMBODIMENTS

Embodiment 1.

Figure 3:
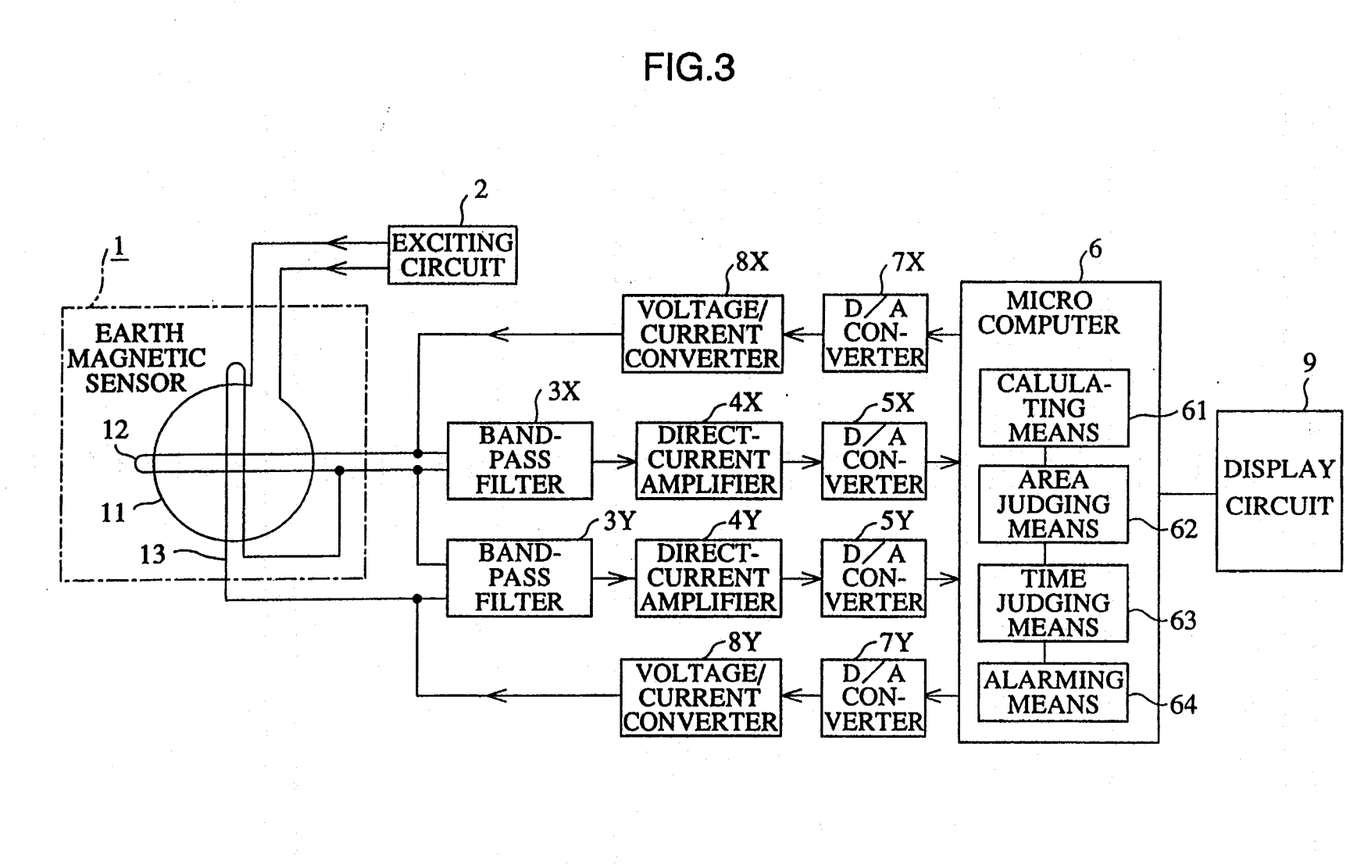
FIG. 3 is a block diagram showing a direction detecting apparatus according to an embodiment 1 of the present invention.

In the following, an embodiment of the present invention will be described with reference to the drawings. In FIG. 3, 1 is an earth magnetic sensor, 11 is an excited coil, 12 is an X-side secondary coil, 13 is a Y-side secondary coil, 2 is an exciting circuit, $3_X$ and $3_Y$ are band-pass filters, $4_X$ and $4_Y$ are direct-current amplifiers, $5_X$ and $5_Y$ are A/D converters, 6 is a microcomputer, 61 is calculating means, $7_X$ and $7_Y$ are D/A converters, $8_X$ and $8_Y$ are voltage/current converters, and 9 is a displaying circuit, which are the same or corresponding parts with those denoted by the same symbols shown in FIG. 1 so that the detailed description will be omitted.

Also, 62 is area judging means for judging whether or not the signals input from the earth magnetic sensor 1 into the calculating means 61 in the microcomputer 6 are outside a judging area for judging whether or not the movable body is magnetized. 63 is time judging means for judging whether or not the time in which the signals input into the calculating means 61 is judged to be outside the judging area by the area judging means 62 continues for more than a previously set predetermined time, and 64 is alarming means for outputting an alarm signal to the display circuit 9 to display an alarm when the signals input into the calculating means 61 are judged to be outside the judging area by the time judging means 63. Note that, in this embodiment, the area judging means 62, the time judging means 63, and the alarming means 64 are realized as software in the microcomputer 6.

Next, the operation will be described. Similar to the conventional case, the Y-side secondary coil 13 and the X-side secondary coil 12 in the earth magnetic sensor 1 generate the voltages $e_X$ and $e_Y$ given by the equations (1) and (2) respectively. Once the voltages $e_X$ and $e_Y$ are determined, the angle $\theta$ between the horizontal component of the earth magnetism and the X-side secondary coil 12 can be calculated from the equations (1) and (2).

The voltages $e_X$ and $e_Y$ become output voltages $V_X$ and $V_Y$ through the band-pass filters $3_X$ and $3_Y$ and direct-current amplifiers $4_X$ and $4_Y$, and are converted into digital amounts by the A/D converters $5_X$ and $5_Y$. By a calculation of an angle by the microcomputer 6 using the converted digital amounts, the angle $\theta$ between the horizontal component of the earth magnetism and the X-side secondary coil 12 is calculated so that the moving direction of the vehicle is displayed by the display circuit 9.

Figure 4:
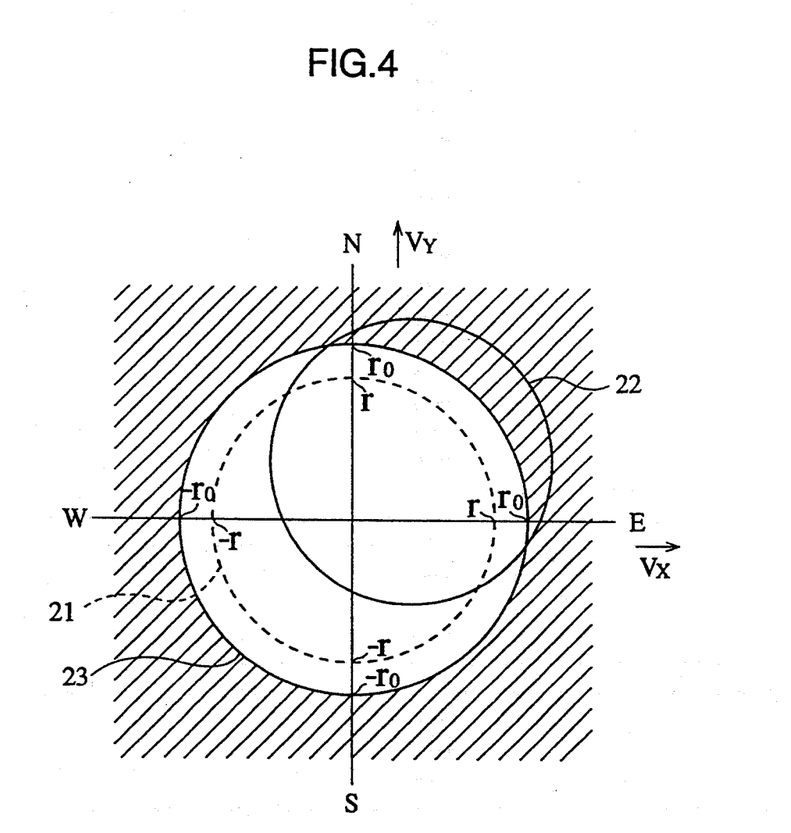
FIG. 4 is an explanatory diagram showing a judging area in the above-mentioned embodiment.

Here, FIG. 4 is an explanatory diagram showing a judging area for judging whether or not the vehicle is magnetized. In the figure, 21 is a locus of the output signals $V_X$ and $V_Y$ when the vehicle is rotated one time without the influence of magnetization of the car body, 22 is a locus of the output signals $V_X$ and $V_Y$ when the vehicle is rotated one time with the influence of magnetization of the car body, and 23 is a boundary of the judging area for judging whether or not the magnetization is present. The locus of the output signals $V_X$ and $V_Y$ when the car body is not magnetized is the circle 21 having its center at the origin 0 and having a radius r. In this embodiment, the judging area is within the circle 23 having its center at the origin 0 and having a radius $r_0$ that is larger than the radius r. When $V_X$ and $V_Y$ are outside the judging area for more than a predetermined time, namely when they are in the region illustrated by slash lines, the alarming means 64 outputs an alarm signal to the display circuit 9 to display an alarm. By this, in case of the locus 21 without magnetization, no alarm is displayed regardless of the direction of the vehicle, and in case of the locus 22 with magnetization, an alarm is displayed when the vehicle directs to a direction roughly between north-northwest and east-southeast.

Next, an alarm process routine in the microcomputer 6 will be described with reference to FIG. 5. When the alarm process routine starts, at step ST1, it is judged whether or not an alarming flag is set. When it is set, the process proceeds to step ST10 to output an alarm display and finish the alarm processing. On the other hand, when the alarming flag is cleared, the process proceeds to steps ST2 and ST3 so that squares of the digital values (as a matter of convenience, these are also referred to as $V_X$ and $V_Y$) corresponding to the direct-current voltage signals $V_X$ and $V_Y$ input from the earth magnetic sensor 1 to the A/D converters $5_X$ and $5_Y$ are calculated respectively. Then, at step ST4, it is judged whether or not the sum $VX^2 + VY^2$ of the calculated results in the afore-mentioned steps ST2 and ST3 is larger than the square of the radius $r_0$ of the circle represented by the boundary 23 for the judgment area for judging whether or not there is magnetization, and if is smaller, the process proceeds to step ST5, and if it is larger, the process proceeds to step ST7.

At step ST5, since the signals $V_X$ and $V_Y$ are within the judging area, a timer for measuring the time period in which the signals $V_X$ and $V_Y$ are outside the judging area, namely, in the region illustrated by slash lines in FIG. 2, is cleared, and then at step ST6, the alarming flag is cleared and the process proceeds to step ST8.

Also, at step ST7, since the signals $V_X$ and $V_Y$ are outside the judging area, the above-mentioned timer is incremented and the process proceeds to step ST8, and in step ST8, it is judged whether or not the contents of the abovementioned timer are larger than a predetermined reference time period $t_0$. As a result, if the contents of the timer are larger than the reference time period $t_0$, the alarming process is finished, and if the contents of the timer are smaller than the reference time period $t_0$, the process proceeds to step ST9. At step ST9, the above-mentioned alarming flag is set, and then at step ST10, an alarm display is output and the alarm processing is finished.

Figure 6:
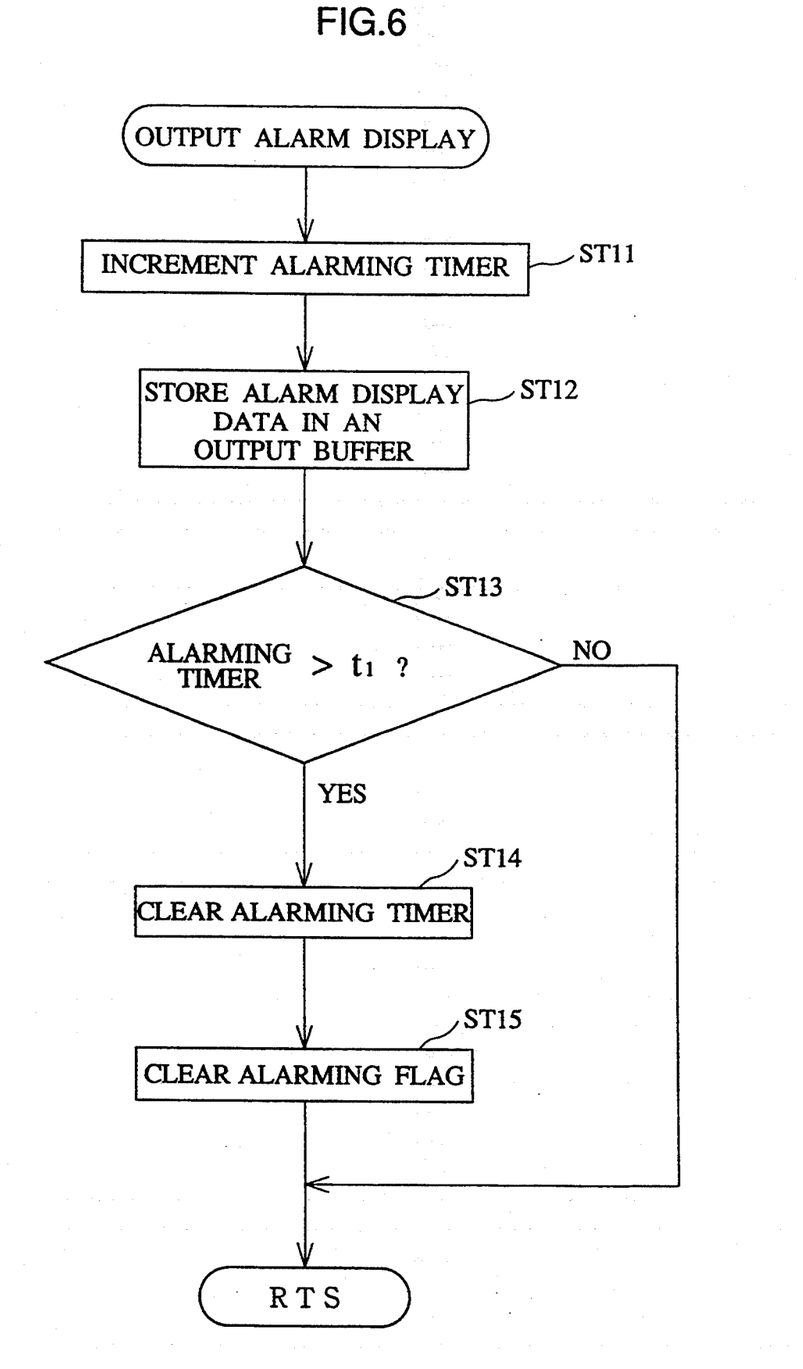
FIG. 6 is a flow chart showing a flow of an alarm display process in the above-mentioned embodiment.

Next, the alarm display output routine at the above-mentioned step ST10 will be described in detail with reference to FIG. 6. When the alarm display output routine starts, at step ST11, the alarming timer for measuring the time period of the alarm display is incremented. Then, at step ST12, alarm display data for effecting the alarm display is stored in a display output buffer and it is displayed as an alarm by the display circuit 9. Then, at step ST13, it is judged whether or not the value of the above-mentioned timer is larger than a predetermined time $t_1$. If it is smaller, the alarm display output routine is finished as it is. If it is larger, the process proceeds to step ST14 so that the above-mentioned alarming timer is cleared, and then at step ST15, the alarming flag is cleared and the alarm display output routine is finished.

According to the above-mentioned embodiment 1, it is not necessary to rotate the vehicle one time for displaying an alarm and, even when the locus of the circle of the output signals $V_X$ and $V_Y$ in the one time rotation of the vehicle do not intersect with the X axis or the Y axis, the alarm display can be effected. In addition, even when the input signals of the calculating means are instantaneously outside the judging area due to magnetic noise and so forth, the alarm is not erroneously generated.

Embodiment 2.

Figure 7:
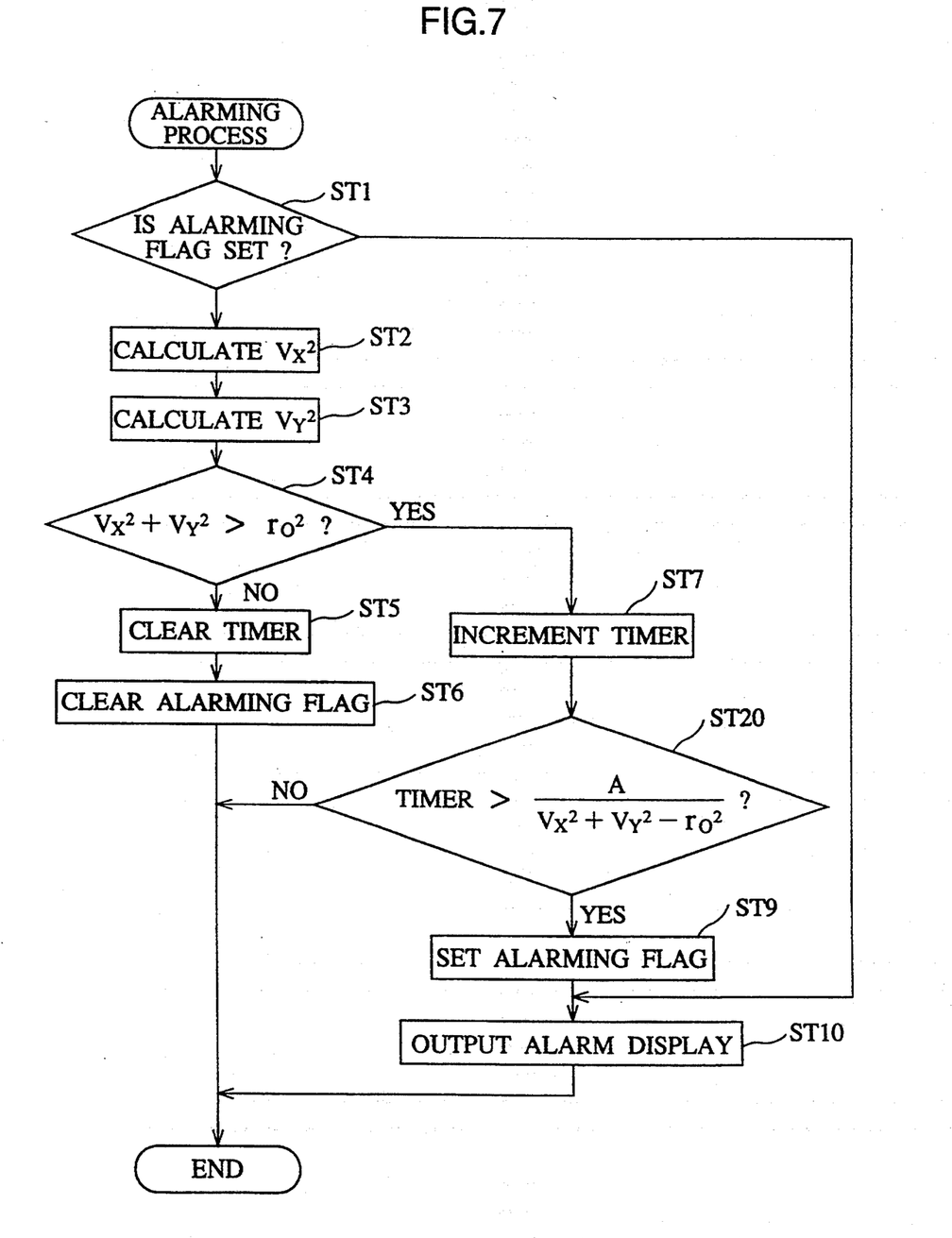
FIG. 7 is a flow chart showing a flow of an alarm process in an embodiment 2 of the present invention.

In the above-described embodiment 1, the time period, in which the signals input to the calculating means 61 are judged to be outside the judging area by the area judging means 62, is compared with the predetermined reference time period $t_0$ which is previously determined as a fixed value, and it is judged whether or not the time period judged to be outside the judging area continues for more than the fixed reference time period $t_0$. Alternatively, however, the predetermined reference time period to be compared may be changed depending on the degree of the signals input into the calculating means 61, being outside from the judging area. FIG. 7 is a flow chart showing an alarm process routine of such an embodiment. Here, in FIG. 7, the steps corresponding to the steps in FIG. 5 are denoted by the same step numbers. In the embodiment 2, the contents of the timer incremented at step ST7 are compared with a time period $T_0$ given by the following equation at step ST20. Note that, in the equation, A is a constant.

$$T_0 = A/(V_X^2 + V_Y^2 - r_0^2) \tag{5}$$

Accordingly, when the value $V_X^2 + V_Y^2$ is close to the value $r_0^2$, namely, when the signals $V_X$ and $V_Y$ are not outside the judging area so much, the time period $T_0$ becomes a large value so that a long waiting time is taken until the alarm is displayed. On the other hand, if the value $V_X^2 + V_Y^2$ is greatly different from the value $r_0^2$, namely, when the signals $V_X$ and $V_Y$ are largely outside the judging area, the time period $T_0$ becomes a small value so that the waiting time until the alarm display becomes short.

By controlling as described above, when the direct voltage signals $V_X$ and $V_Y$ inputted from the earth magnetic sensor 1 into the microcomputer 6 are outside the judging area (the circle having the radius $r_0$), an alarm display for the constant time period $t_1$ is effected with a judgement of a long waiting time when the degree of the signals $V_X$ and $V_Y$ being outside from the judging area is small, and with a judgement of a short waiting time when the degree of the signals being outside is large.

Embodiment 3.

Figure 5:
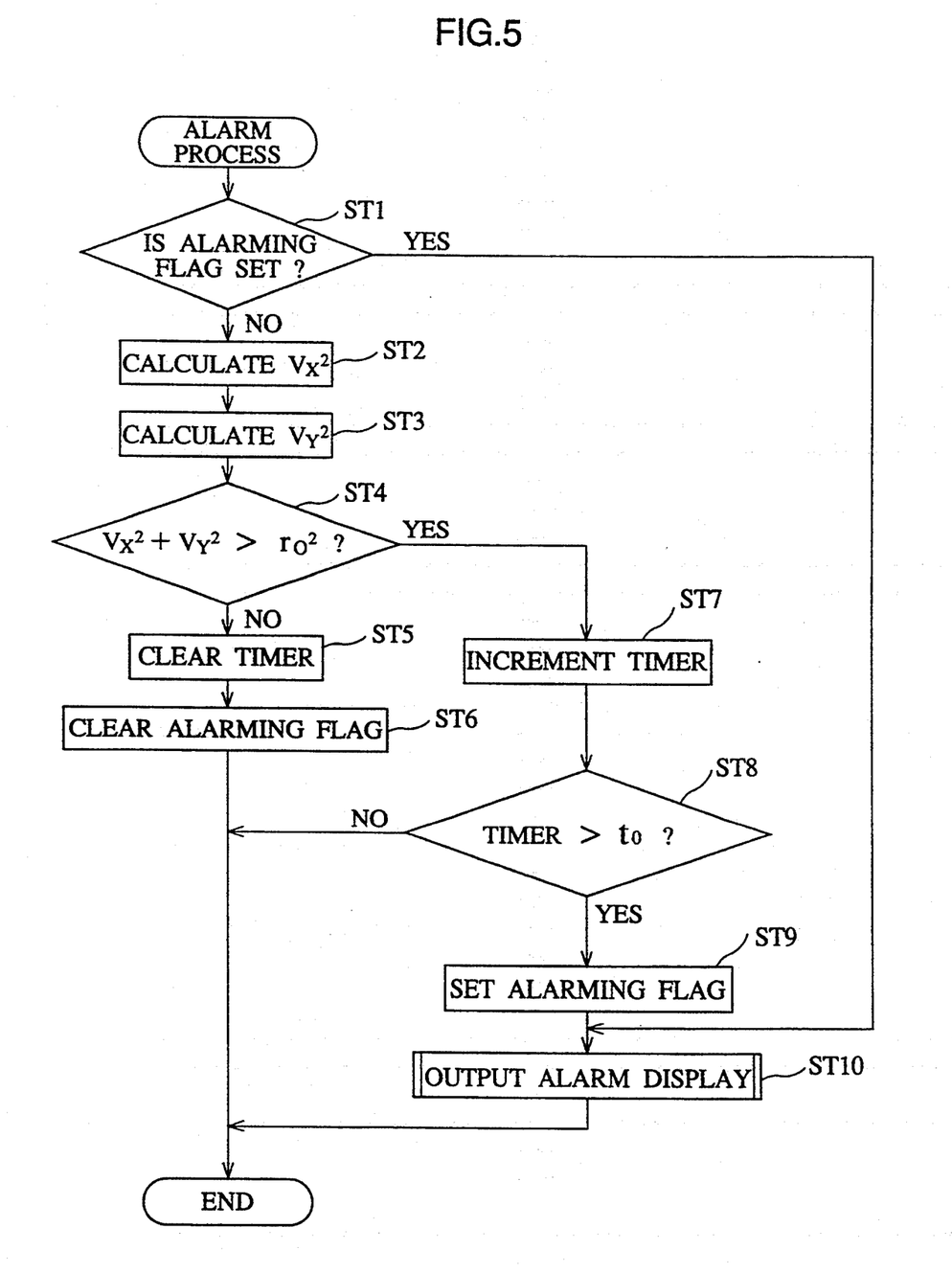
FIG. 5 is a flow chart showing a flow of an alarming process in the above-mentioned embodiment.
Figure 8:
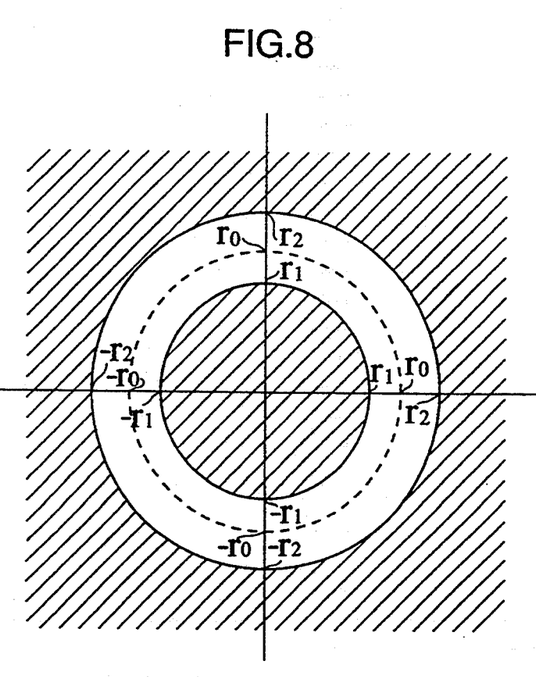
FIG. 8 is an explanatory diagram showing an example of a judging area in an embodiment 3 of the present invention.

In the above-described embodiments, explanations were given for the case when the judging area is a real circle having a radius $r_0$ so that the judgement at step ST4 in FIG. 5 or FIG. 7 is "$V_X^2 + V_Y^2 > r_0^2$?", however, it may also be possible to effect the judgement by forming the judging area by two circles as shown in FIG. 8 so as to effect a judgement of "$r_0^2 > V_X^2 + V_Y^2 > r_1^2$?". In this case, the judging area is an area sandwiched between two concentric circles. One of the circles has a predetermined radius $r_2$ larger than the radius $r_0$ of a reference circle. The reference circle is a locus of the signals $V_X$ and $V_Y$ corresponding to the output of the earth magnetism sensor in a plane when the movable body is rotated one time within the plane. The other one of the circles has a predetermined radius $r_1$ smaller than the radius $r_0$ of the reference circle. The locus of the reference circle is present within the judging area.

Alternatively, as shown in FIG. 9, the judging area may be formed by an ellipse so as to effect a judgement of "$V_X^2/r_3^2 + V_Y^2/r_3^2 > 1$?". In this case the judging area is an area within an ellipse having a predetermined minor axis $r_3$ larger than the radius $r_0$ of the reference circle. The locus of the reference circle is present within the ellipse.

Thus, by changing the form or the size of the judging area, the frequency of the alarm generation can be arbitrarily changed.

Embodiment 4.

Also, in the above-described embodiments, as alarming means, alarm is displayed on the display circuit 9, however, another means may also be employed by using alarming sound such as buzzer and so forth or by using both of them to provide the same effects as in the above-described embodiments.

As described above, according to the first aspect of the present invention, since it is so constructed that an alarm is effected when the signals inputted from the earth magnetic sensor into the calculating means are judged to be outside the judging area for judging whether or not the movable body is magnetized, there is an effect in that a direction detecting apparatus can be obtained which can surely display an alarm for prompting magnetization correction without the necessity to rotate the vehicle one time, and even when the locus of the circle of the output signals $V_X$ and $V_Y$ does not intersect with the X axis or the Y axis.

Also, according to the second aspect of the present invention, since it is so constructed that an alarm is effected when the time period, in which the signals input into the calculating means are outside the judging area, is judged to be continued for more than the previously set predetermined time, there is an effect in that a direction detecting apparatus can be obtained in which even when the output signals $V_X$ and $V_Y$ of the earth magnetic sensor are instantaneously outside the judging area due to magnetic noise, the alarm is not erroneously generated.

Further, according to the third aspect of the present invention, since it is so constructed that the predetermined time for determining the generation of the alarm is changed in accordance with the degree of the amount of the signals, which are outside the judging area and are input into the calculating means, the frequency of the generation of alarms can be changed depending on the amount of the magnetization of the car body.

What is claimed is:

1. A direction detecting apparatus for detecting a direction of a movable body comprising:
   an earth magnetic sensor, mounted on said movable body, for detecting earth magnetism, and a horizontal component of said earth magnetism by dividing said earth magnetism into two orthogonal components
   calculating means, connected to said earth magnetism sensor, for generating, based on an output signal from said earth magnetic sensor, an angle signal indicative of an angle between a moving direction of said movable body and the horizontal component of the earth magnetism;
   area judging means, connected to said calculating means, for judging whether output signals of said earth magnetism sensor provided to said calculating means are outside a judging area, defined at least by a circular perimeter having a radius larger than the radius of a reference circle, said reference circle being a locus of output signals of said earth magnetism sensor in a plane when said movable body is rotated one time within said plain, for determining whether said movable body is magnetized; and
   prompting means, connected to said area judging means, for prompting a magnetization correction with regard to magnetization of said movable body when said signals provided to said calculating means are determined to be outside said judging area by said area judging means.

2. A direction detecting apparatus as claimed in claim 1, further comprising:
   time judging means, connected to said area judging means, for judging whether a time period in which the output signals of said earth magnetic sensor are judged to be outside said judging area for more than a predetermined time period, wherein said prompting means prompts when the output signals are judged to be outside said judging area for a time longer than said predetermined time period.

3. A direction detecting apparatus as claimed in claim 2, wherein in said predetermined time period changes in accordance with a degree of said amount of output signals of said earth magnetism sensor being outside said judging area.

4. A direction detecting apparatus as claimed in claim 1, wherein said reference circle is concentric with said circular perimeter of said judging area.

5. A direction detecting apparatus as claimed in claim 1, wherein said judging area is an area sandwiched between two concentric circles, one of said circles having a predetermined radius larger than the radius of said reference circle, the other one of said circles having a predetermined radius smaller than the radius of said reference circle, the locus of said reference circle being present within said judging area.

6. A direction detecting apparatus as claimed in claim 1, wherein said judging area is an area within an ellipse having a predetermined minor axis larger than the radius of said reference circle, the locus of said reference circle being present within said ellipse.

7. The direction detecting apparatus of claim 1, further comprising:
   a displaying circuit, connected to said calculating means, for displaying said moving direction of said movable body based on said angle signal generated by said calculating means.

8. A direction detecting apparatus as claimed in claim 1, wherein said prompting means gives an alarm for prompting a magnetization correction.

9. A method for detecting a direction of a movable body having an earth magnetic sensor comprising the steps of:
   detecting, based on an output signal of said earth magnetic sensor, earth magnetism and a horizontal component of said earth magnetism by dividing said earth magnetism into two orthogonal components;
   generating an angle signal indicative of an angle between a moving direction of said movable body and detected said horizontal component of the earth magnetism;
   judging whether output signals of said magnetic sensor are outside a judging area defined at least by a circular perimeter having a radius larger than the radius of a reference circle, said reference circle being a locus of output signals of said earth magnetism sensor in a plane when said movable body is rotated one time within said plain, for judging whether said movable body is magnetized; and
   prompting a magnetization correction with regard to magnetization of said movable body when said output signals are judged to be outside said judging area.

10. The method of claim 9, further comprising the step of:
    displaying a moving direction of said movable body based on said angle signal generated by said generating step.

11. The method of claim 9, further comprising the step of:
    determining whether said output signals are being outside said judging area for more than a predetermined time period, and said prompting step prompts the magnetization correction when said output signals are outside said judging area for a time period longer than said predetermined time period.

12. The method of claim 11, wherein said determining step comprising the substep of:
    changing said predetermined time period in accordance with a degree of said output signals being outside said judging area.

13. The method of claim 9, wherein said reference circle is concentric with said circular perimeter of said judging area.

14. The method of claim 9, wherein said judging area in said judging step is an area sandwiched between two concentric circles, one of said circles having a predetermined radius larger than the radius of said reference circle, the other one of said circles having a predetermined radius smaller than the radius of said reference circle, the locus of said reference circle being present within said judging area.

15. The method of claim 9, wherein said judging area is an area within an ellipse having a predetermined minor axis larger than the radius of said reference circle, the locus of said reference circle being present within said ellipse.

* * * * *

UNITED STATES PATENT AND TRADEMARK OFFICE
CERTIFICATE OF CORRECTION

PATENT NO. : 5,440,303
DATED : August 8, 1995
INVENTOR(S) : Hidehiko Kinoshita

It is certified that error appears in the above-indentified patent and that said Letters Patent is hereby corrected as shown below:

In the figure shown on the title page, change "CALULATING MEANS" in Box 61 to --CALCULATING MEANS--;

In Fig. 3, please change "CALULATING MEANS" in Box 61 to --CALCULATING MEANS--;

In column 2, line 21, change "FIG. 9" to --FIG 2--;

In column 5, line 61, change "and process proceeds to step ST8" to --and the alarm process is finished--; and In column 7, line 29, change " "$V_X{}^2/r_3{}^2 + V_Y{}^2/r_3{}^2 > 1?$" " to -- "$V_X{}^2/r_3{}^2 + V_Y{}^2/r_4{}^2 > 1?$" --.

Signed and Sealed this

Ninth Day of July, 1996

Attest:

BRUCE LEHMAN

*Attesting Officer*  *Commissioner of Patents and Trademarks*